Figure 1:
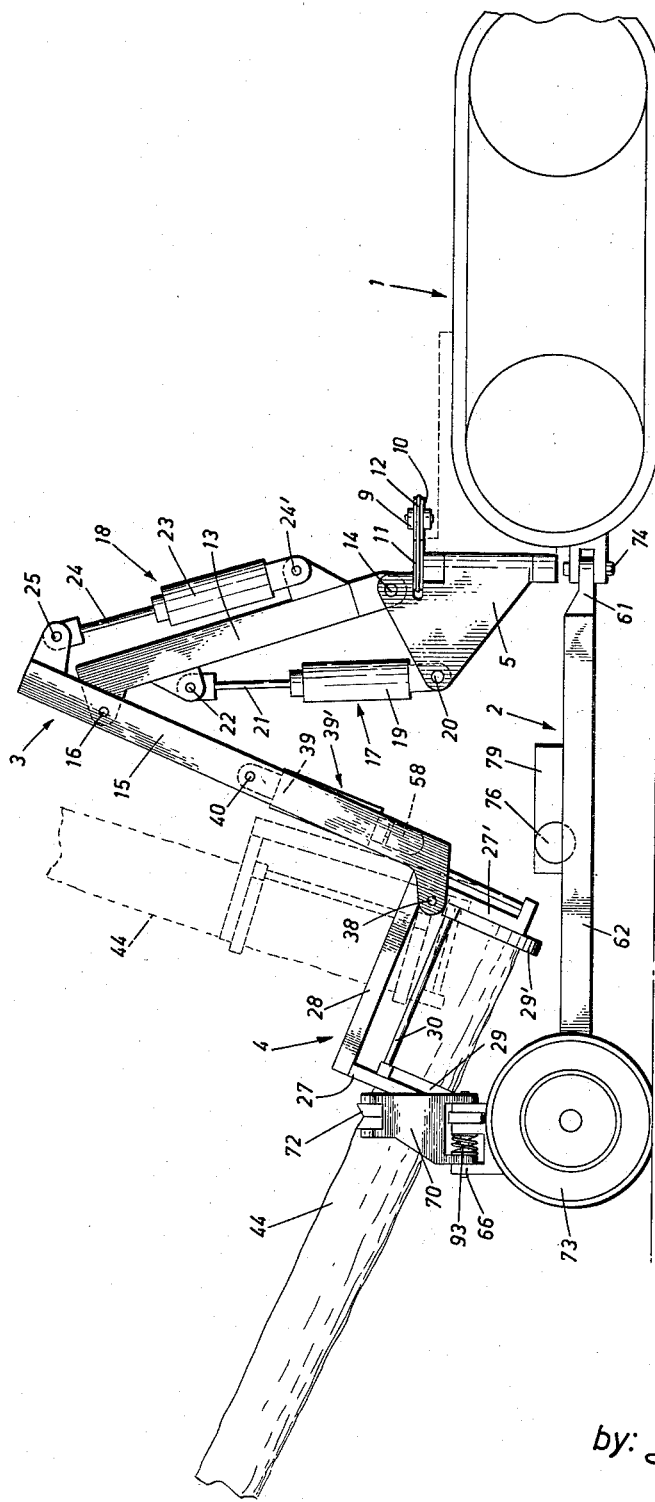

Sept. 3, 1963 D. C. HORNCASTLE 3,102,562
TREE FELLING AND BUNCHING MECHANISM
Filed Nov. 23, 1960 6 Sheets-Sheet 1

Inventor
DAVID C. HORNCASTLE by: *Harold G. Fox*
Attorney

Inventor
DAVID C. HORNCASTLE
by: Harold E. Fox
Attorney

Sept. 3, 1963      D. C. HORNCASTLE      3,102,562
TREE FELLING AND BUNCHING MECHANISM
Filed Nov. 23, 1960      6 Sheets-Sheet 3

Inventor
DAVID C. HORNCASTLE
by: *Harold G. Fox*
Attorney

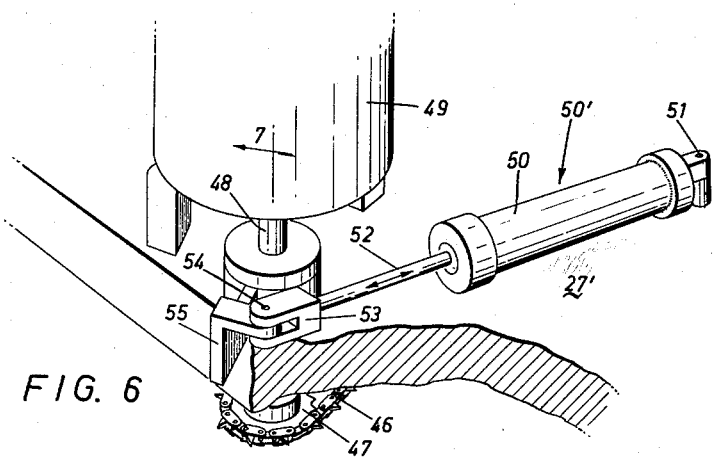
FIG. 6
FIG. 7
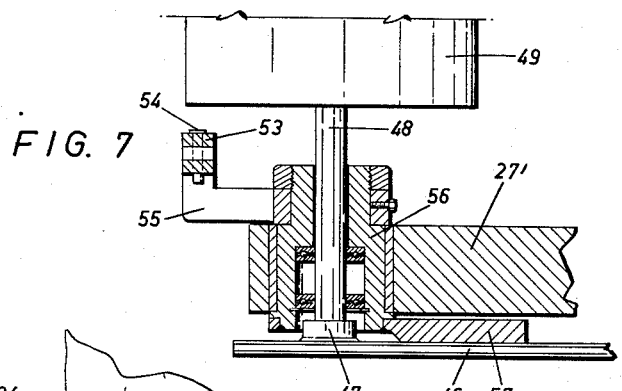
FIG. 4
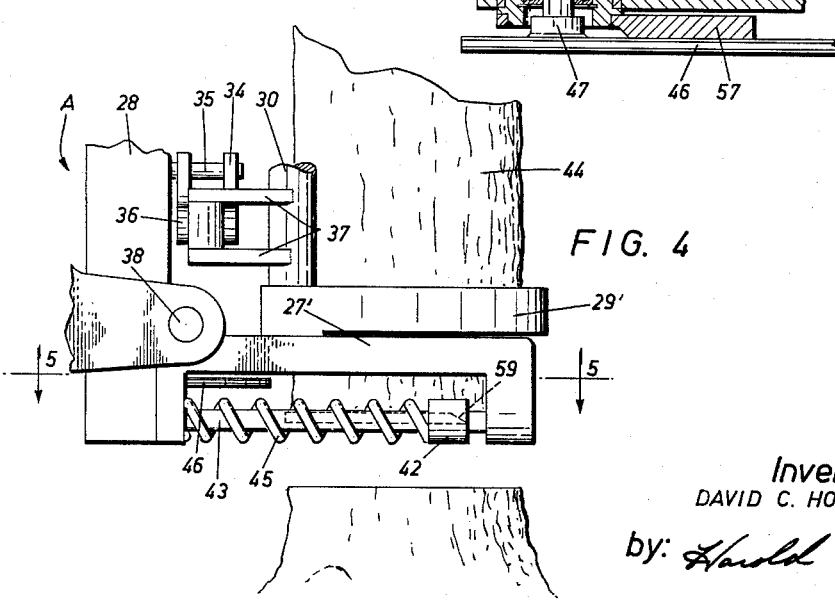
Inventor
DAVID C. HORNCASTLE
by: *Harold G. Fay*
Attorney Sept. 3, 1963 D. C. HORNCASTLE 3,102,562
TREE FELLING AND BUNCHING MECHANISM
Filed Nov. 23, 1960 6 Sheets-Sheet 5

Inventor
DAVID C. HORNCASTLE by: *Harold G. Fox*
Attorney

United States Patent Office 3,102,562
Patented Sept. 3, 1963

3,102,562
TREE FELLING AND BUNCHING MECHANISM
David Clarkson Horncastle, St. Catharines, Ontario, Canada, assignor to The Ontario Paper Company Limited, Thorold, Ontario, Canada
Filed Nov. 23, 1960, Ser. No. 71,259
5 Claims. (Cl. 144—3)

This invention relates generally to the harvesting of trees. More particularly this invention relates to a mobile unit which performs the functions of felling and bunching trees.

In the past it has been common practice to fell trees by conventional means such as axes or saws, in some cases cut the trees into pulpwood lengths where they fall, pile the pulpwood lengths into stacks and transport the stacks from the forest. Generally speaking these four steps have been accomplished by employing a number of different types of apparatus.

Accordingly, it is one object of my invention to provide apparatus which performs the dual functions of felling trees and bunching or stacking the felled trees, the stacked trees being left for pick-up and transportation out of the forest by apparatus such as a tractor arch.

Another object of my invention is to provide such apparatus as aforementioned and which is mobile.

A further object of my invention is to provide a mobile unit for felling and bunching trees designed in such a manner that it may be driven to a position adjacent a plurality of trees, and, without moving from the position, is adapted to fell and bunch all trees within reach of the unit, the stacked trees either being left for pick-up by another device when the mobile unit moves to another position or skidded along with the mobile unit.

Yet another object of my invention is to provide a mobile unit which rapidly fells and bunches trees under controlled conditions.

Still another object of my invention is to provide a mobile unit which cuts standing trees off at the stump and does not permit the severed tree to touch the ground until it is dropped into bunching position.

Another important object of my invention is to provide a mobile bundling apparatus for bunching felled trees.

In brief, a mobile unit for felling and bunching trees embodying my invention comprises a tractor, a boom pivotally mounted on the tractor about a vertical axis, gripping means for gripping an upright tree at its base, the gripping means being pivotally mounted on the boom about a horizontal axis, sawing means for sawing through the trunk of a tree below the gripping means, and a mobile bundling apparatus associated with the tractor at the rear thereof and adapted to be moved with the tractor. Means are provided for tilting the gripping means and the sawed-off section of a tree gripped thereby to an off-vertical position and towards the tractor. Other actuating means are provided for rotating the boom, gripping means and the sawed-off section of a tree gripped thereby in the off-vertical position to the rear of the tractor. The mobile bundling apparatus includes a frame having a pair of side arms defining a rearwardly open space therebetween. Flexible cable means are positioned between the arms and are adapted to be tightened and drawn about a bundle of sawed-off sections of trees laid between the arms and across the cable means. The first actuating means are adapted to tilt the gripping means and the sawed-off section of a tree gripped thereby when in the off-vertical position at the rear of the tractor to an off-vertical position away from the tractor. Means are provided for releasing the gripping means and permitting the sawed-off section of a tree gripped thereby to fall between the side arms and across the cable means. Tightening means are provided for tightening and drawing the cable means about a number of sawed-off sections of trees so laid across the cable means.

In accordance with one embodiment of my invention, I provide, in combination with tree felling apparatus of the type having gripping means for gripping the trunk of an upright tree and sawing means for sawing through the trunk of the tree below the gripping means, the improvement which comprises a support positioned below the sawing means to prevent the trunk of the tree from settling in this sawing means during the cutting operation. The support is adapted to slide under the butt of the sawed-off section of the tree and support the sawed-off section during removal thereof from the stump of the tree.

In accordance with another embodiment of my invention I provide a mobile bundling apparatus for bunching felled trees. The apparatus comprises a mobile frame having a pair of spaced-apart side arms. Flexible cable means such as a wire rope or chain lie across the space between the side arms and is adapted to receive trees thereacross. Tightening means such as a winch tighten and draw the cable means about sawed-off sections of trees laid across the cable means.

Figure 2:
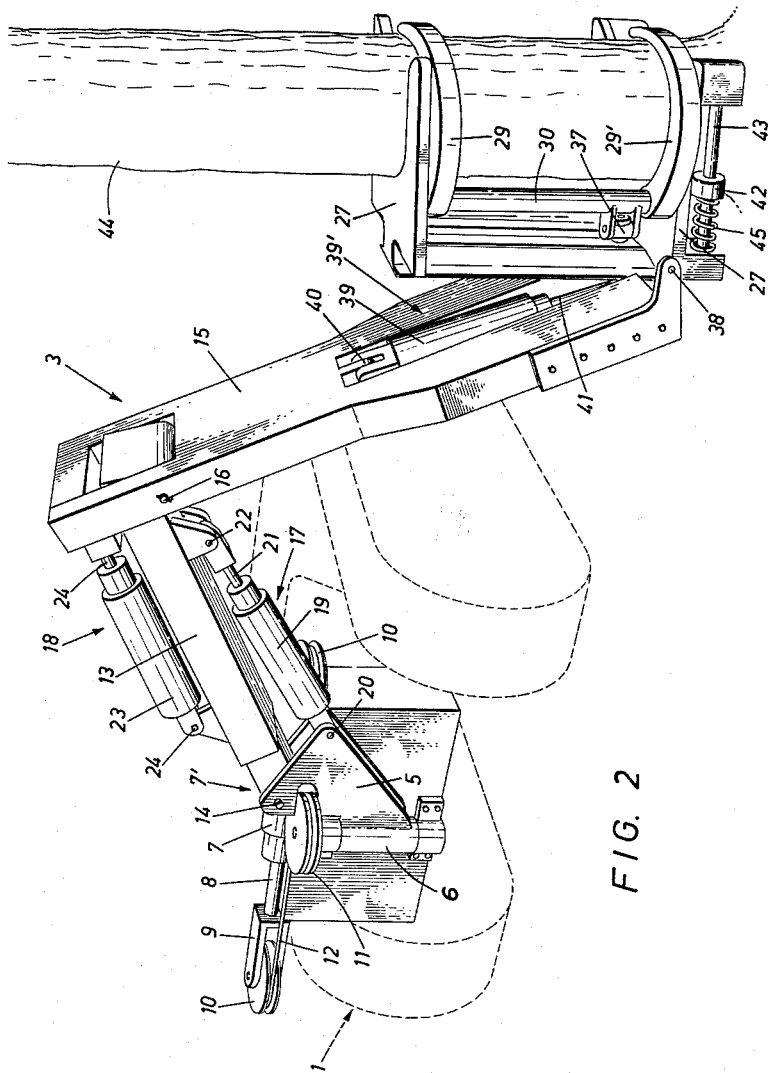
Figure 3:
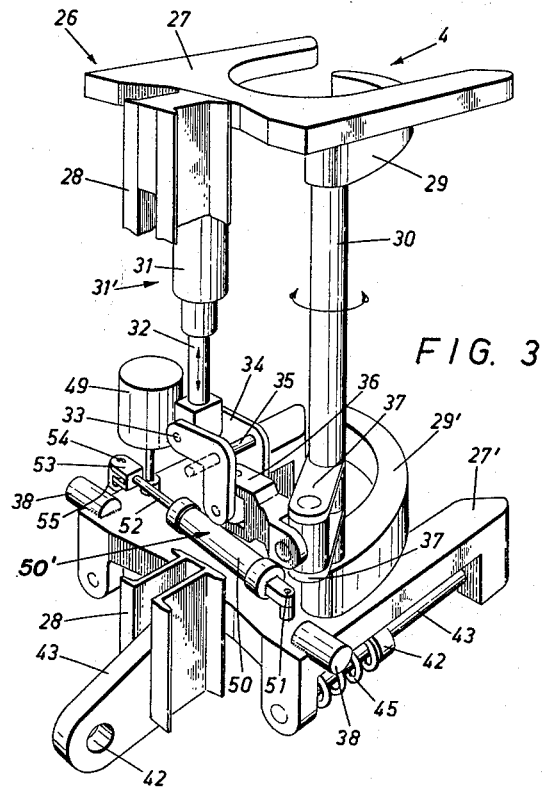
Figure 5:
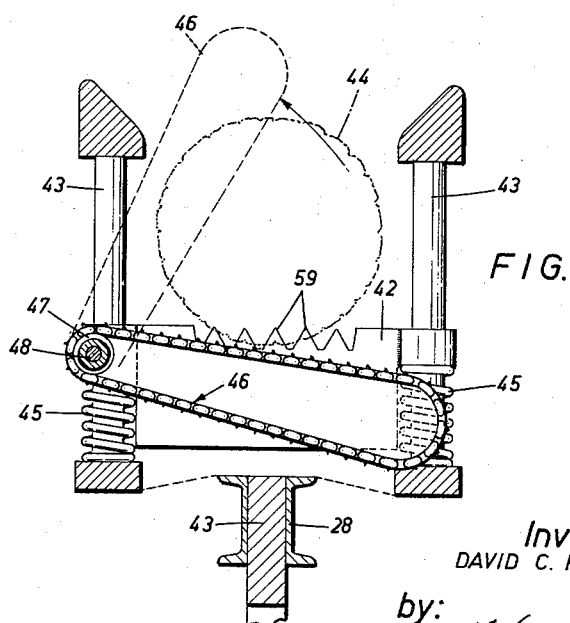
Figure 8:
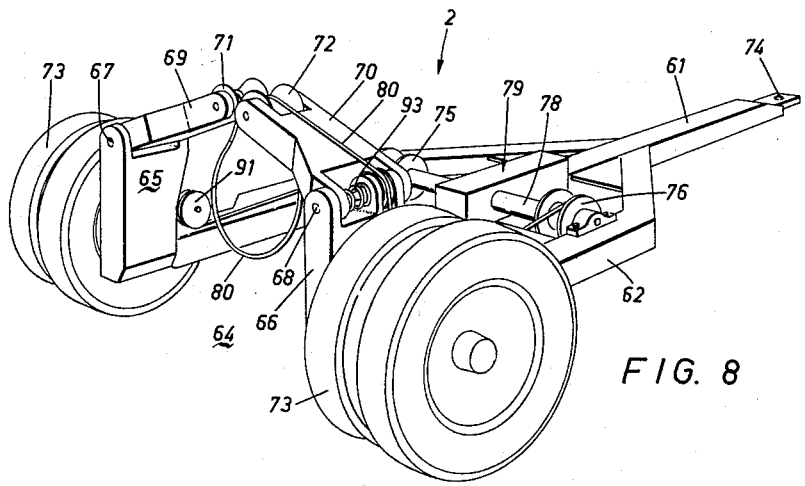
Figure 9:
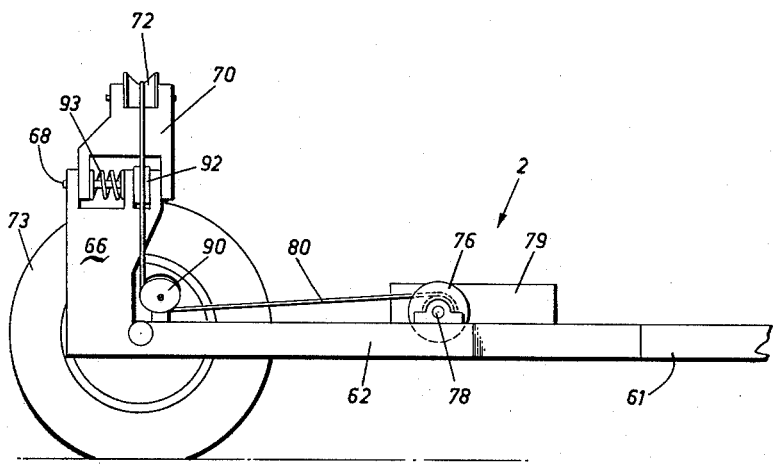
Figure 10:
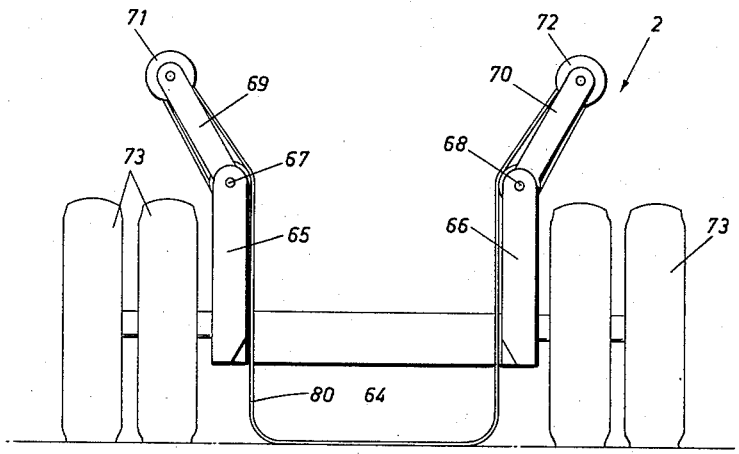
Figure 11:
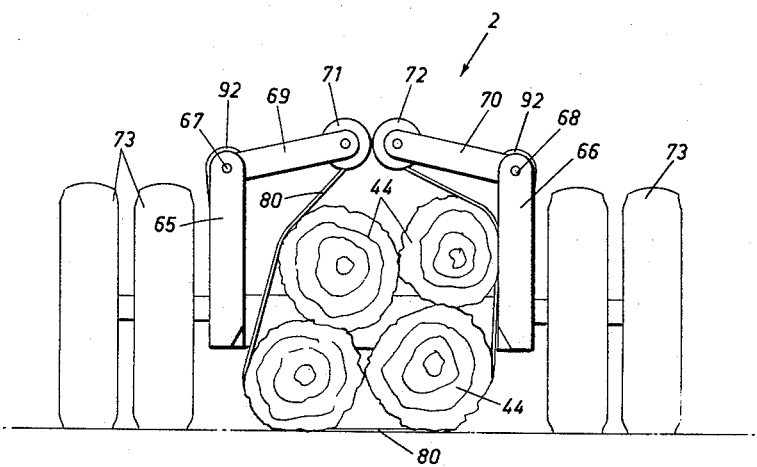

Other objects and advantages of apparatus embodying my invention will become apparent from the following detailed disclosure taken in conjunction with the drawings, in which:

FIGURE 1 is a side elevation of a mobile unit for felling and bunching trees embodying my invention, FIGURE 2 is a perspective view showing a mobile unit embodying my invention with the tree bunching device thereof detached for sake of clarity, FIGURE 3 is a perspective view of tree gripping and sawing apparatus useful in practising my invention, FIGURE 4 is a side elevation of the lower part of the tree gripping and sawing apparatus illustrated in FIGURE 3, FIGURE 5 is a section taken along line 5—5 on FIGURE 4, FIGURE 6 is a perspective view showing details of the drive and pivot arrangement of the saw shown in FIGURE 5, FIGURE 7 is a section taken along line 7—7 in FIGURE 6, FIGURE 8 is a perspective view of tree bunching apparatus employed in practicing my invention, FIGURE 9 is a side elevation of the tree bunching apparatus shown in FIGURE 8, and FIGURES 10 and 11 are rear elevations of the tree bunching apparatus showing the apparatus ready to receive trees and bunching trees respectively.

*General*

Referring to the drawings, and in particular to FIGURES 1 and 2, apparatus embodying my invention consists generally of a mobile unit comprising a tractor 1 (indicated schematically) and bundling apparatus 2. At the rear of tractor 1 is pivotally mounted a boom 3, having tree gripping means 4 pivotally mounted at the end thereof remote from tractor 1. As will become more apparent hereinafter, boom 3 may be pivoted about horizontal and vertical axes to position gripping means 4 in a location where it is permitted to grip the trunk of a standing tree. Gripping means 4 is provided with a saw to cut through the tree. The cut-off section of the tree then may be manipulated suitably in a manner to be hereinafter described and placed in bundling apparatus 2. When a number of such trees have been so cut and located, they may be bundled together with bundling apparatus 2, bound, and left in the forest to be picked up and transported to their final destination or some intermediate point by means such as a tractor arch.

Tractor and Boom

Tractor 1 may be of any well-known type, preferably provided with tracks rather than wheels.

Referring to FIGURES 1 and 2, boom 3 consists of a frame member 5 pivotally mounted on a vertical pivot 6 at the rear of tractor 1. Frame member 5, and hence boom 3 is adapted to pivot about pivot 6 through an angle of about 180°.

The mechanism for rotating frame member 5 and boom 3, about pivot 6 is shown best in FIGURE 2. This mechanism comprises hydraulically actuable means 7' including a cylinder 7 having a hydraulically actuable piston means (not shown) therein. The piston means is connected to piston rods 8, only one of which is shown and which extend in opposite directions through the ends of cylinder 7. Piston rods 8 have yokes 9 secured to the ends thereof remote from cylinder 7. Guide means such as sheaves 10 are rotatably mounted in yokes 9 about a vertical axis. Secured to frame member 5 is a sheave 11 which is positioned about vertical pivot 6. A flexible cable 12 such as a wire rope has its two free ends secured to a fixed point such as cylinder 7 and is drawn around sheaves 10 and 11 and frictionally engages the same. The piston means in cylinder 7 is hydraulically actuable and its position and hence the position of sheaves 10 may be controlled by the operator with suitable control means (not shown). When the piston means is caused to move to the left in FIGURE 2, by the operator, both sheaves 10 move to the left causing wire rope 12 to impart rotational movement about pivot 6 to boom 3 through sheave 11 and frame member 5.

As mentioned previously boom 3 may be rotated about pivot 6 through about 180° in the aforementioned manner.

Boom 3 has first section 13 which is pivotally mounted at one end about a horizontal pivot 14 on frame member 5. A second section 15 is pivotally mounted on the opposite end of first section 13 about a horizontal pivot 16 on first section 13. First and second sections 13 and 15 are preferably made of structural steel.

Means are provided for actuating the first and second sections to cause pivoting thereof about their respective horizontal pivots. These means comprise hydraulically actuable means 17 and 18. Hydraulically actuable means 17 consists of a cylinder 19 pivotally mounted about a horizontal pivot 20 on frame member 5. Hydraulically actuable piston means (not shown) are provided in cylinder 19. These piston means are connected to a piston rod 21 which has its end remote from cylinder 19 pivotally connected to first section 13 at a horizontal pivot 22. Hydraulically actuable means 18 consists of a cylinder 23 pivotally mounted about a horizontal pivot 24' on first section 13. Hydraulically actuable piston means (not shown) are provided in cylinder 23 and are connected to a piston rod 24 having its end remote from cylinder 23 pivotally connected about a horizontal pivot 25 to one end of second section 15. Operation by the operator by suitable control means (not shown) of hydraulically actuable means 17 causes first section 13 to pivot in a vertical plane about horizontal pivot 14. Operation of hydraulically actuable means 18 by an operator by suitable control means (not shown) causes second section 15 to pivot in a vertical plane about horizontal pivot 16.

Thus it will be seen that boom 3 and gripping means 4 may be rotated in both horizontal and vertical planes.

Gripping Means

Gripping means 4 is best seen in FIGURES 1, 2, 3 and 4. Referring to these figures, gripping means 4 comprises a frame 26 consisting of a pair of spaced-apart, generally U-shaped metal plates 27 and 27' secured together by channel irons 28. A pair of tree gripping lugs 29 and 29' are fixed to a rotatable rod 30 which is pivotally mounted about a vertical axis on plates 27 and 27'. Lugs 29 may be actuated to grip the trunk of a tree which is adapted to be positioned in the U-shaped portions of plates 27 and 27'. In FIGURE 3 lugs 29 and 29' are shown in the closed position, and the tree gripping action of the lugs is plainly visible in FIGURE 2. The linkage to rotate lugs 29 and 29' to an open or closed position comprises hydraulically actuable means 31' including a cylinder 31 (best shown in FIGURE 3) which is pivotally mounted about a horizontal axis on channel irons 28. Hydraulically actuable piston means (not shown) are provided in cylinder 31 and are connected to a piston rod 32. The end of piston rod 32 remote from cylinder 31 is pivotally connected at 33 about a horizontal axis to a V-shaped yoke 34. Yoke 34 is pivotally mounted on channel irons 28 about horizontal pivot 35 (FIGURES 3 and 4). Another yoke 36 is pivotally connected about both horizontal and vertical axes to the end of yoke 34 remote from pivot 33. The opposite end of yoke 36 is similarly pivotally connected about both vertical and horizontal axes to arms 37 fixed to rod 30. With such a linkage it will be apparent that actuation of the piston means in cylinder 31 so as to cause piston rod 32 to travel upwardly will rotate rod 30 in such a manner as to cause tree gripping lugs 29 to assume the open position thereof. Opposite, i.e. downward movement of piston rod 32, will cause lugs 29 to assume the closed position thereof. Hydraulically actuable means 31' may be controlled by the operator by suitable control means (not shown).

Gripping means 4 is pivotally connected at one end of second section 15 by means of horizontal pivots 38. Means are provided to actuate gripping means 4 in a vertical plane about horizontal pivots 38. These means are best shown in FIGURES 1 and 2 and comprise hydraulically actuable means 39' including a cylinder 39 pivotally connected about a horizontal axis at 40 to second section 15. Positioned inside cylinder 39 is a hydraulically actuable piston (not shown) which is connected to a piston rod 41. The end of piston rod 41 remote from cylinder 39 is provided with a yoke 58 affixed thereto. Yoke 58 is pivotally connected about a horizontal axis to gripping means 4 by means of a pivot 42 on an arm 43 suitably secured to channel irons 28. When piston rod 41 is fully retracted, gripping means 4 assumes the position indicated in the solid outlines in FIGURE 1. When piston rod 41 is fully extended, gripping means 4 assumes the position shown in the dotted outlines in FIGURE 1. Thus it will be seen that gripping means 4 may be rotated in a vertical plane at the discretion of the operator by means of suitable controls (not shown) for hydraulically actuable means 39'.

As best shown in FIGURES 4 and 5, positioned under tree gripping means 4, tree gripping lugs 29 and 29' and plate 27' is a support or dog 42. Support 42 comprises a plate having a serrated front edge 59 which is adapted to dig into the stump of a tree to prevent the severed tree from settling on and binding chain saw 46. One of the main purposes of support 42 is, as aforementioned, to anchor, as far as vertical movement is concerned, the tree gripping and sawing means to prevent the tree from settling on and binding the chain saw during cutting. It will be appreciated that if no such support or dog is provided, as in the case of the apparatus shown in Canadian Patent No. 597,415, John T. Pope, issued May 3, 1960, as the saw is nearly through the cut, the remaining uncut portion fails, and the weight of the tree is transferred from the stump to the tractor. The tractor is often supported on soft forest soil, and hence will settle slightly due to the added weight of the tree. Since it takes only about ¼" of settlement to bind the saw, it will be apparent that there will be a strong tendency towards binding unless means such as dog or support 42 are provided. Support 42 is slidably mounted on rods 43 and is urged forward towards the tree 44 (as best shown in FIGURE 5) by means of heavy compression springs 45. As will become more apparent hereinafter, after tree 44 has been cut, dog 42 assumes another function which is to provide a base or support on which the sawed-off section of the tree can rest. This particular aspect of the function of support 42 is best shown in FIGURE 4. It will be seen from this figure that when the trunk of the tree is lifted from the stump, support 42 slides under the butt of the sawed-off section of the tree as a result of the action of springs 45. As also will become more apparent hereinafter, dog or support 42 performs an additional function, which is to prevent the sawed-off section of a tree from dropping vertically in front of the butts of trees already laid in the bundling apparatus under conditions such that gripping means 4 is only slightly off-vertical when lugs 29 are opened.

As best shown in FIGURES 4, 5, 6 and 7 a chain saw 46 of conventional type is positioned beneath plate 27' and above dog 42 and is adapted to be moved from the position shown in heavy outlines in FIGURE 5 to the position shown in dotted outlines. In the course of this movement tree 44 is sawed through.

Chain saw 46 is driven by a sprocket 47 fixed to the shaft 48 of a motor 49.

In order to permit the required pivotal movement of saw 45 to cut through a tree, hydraulically actuable means 50' are provided. These means include a cylinder 50 pivotally mounted about a vertical axis on plates 27' at 51, and a hydraulically actuable piston (not shown) mounted in cylinder 50 and connected to a piston rod 52. Piston rod 52 has a yoke 53 secured to the end thereof remote from cylinder 50. Yoke 53 is pivotally connected about a vertical pivot 54 to an arm 55. As best shown in FIG. 7, arm 55 is connected to a cylinder 56 which, in turn, is secured to a finger 57 affixed to the plate of chain saw 46 around the periphery of which the teeth of the chain saw travel. Cylinder 56 is rotatable in plate 27'.

It will be apparent from a consideration of the foregoing that movement of the piston in cylinder 50 will be transmitted through piston rod 52, yoke 53, arm 55, cylinder 56 and finger 57 to chain saw 46 to cause the chain saw to move in a plane parallel to plate 27'. Hydraulically actuable means 50' may be controlled by the operator with suitable controls (not shown).

*Mobile Bundling Apparatus*

The mobile bundling apparatus 2 is shown in FIGURES 1 and 8 to 11 inclusive, and best shown in the latter four figures. This apparatus comprises a frame 61 having a pair of side arms 62 and 63 defining a rearwardly open spaced 64 therebetween. The frame of the apparatus therefore is generally Y-shaped. Each of the side arms 62 and 63 is provided with upstanding arms 65 and 66. Pivotally mounted about horizontal pivots 67 and 68 on upstanding arms 65 and 66 respectively are guide arms 69 and 70. Guide means in the form of sheaves 71 and 72 are rotatably mounted about horizontal axes on the ends of guide arms 69 and 70 respectively remote from pivots 67 and 68.

Mobile bundling apparatus 2 is provided with wheels 73 and is secured to tractor 1 by means of a hitch 74.

A pair of winch means 75 and 76 are connected on a common shaft 78 and are driven by means of a hydraulic motor 79. Flexible cable means 80 such as a wire rope is adapted to have each of its ends wound up on winches 75 and 76. Flexible cable 80 passes over sheaves 90 and 91 rotatably mounted on side arms 62 and 63, over sheaves 92 rotatably mounted on pivot shafts 67 and 68, over sheaves 71 and 72 and across the space 64 between the rearwardly opening side arms 62 and 63 of the mobile bundling apparatus.

Guide arms 69 and 70 are resiliently biased to the open position shown in FIGURE 10 by springs 93, only one of which is shown. When the guide arms are in their open position the mobile bundling apparatus is adapted to receive the sawed-off sections of trees between the side arms of the apparatus and across the flexible cable 80. The sawed-off sections of the trees may be dropped between the side arms without striking the guide arms when the guide arms are biased to their open position.

After a number of sawed-off sections of trees have been deposited between the side arms 62 and 63 and across the cable 80, as best shown in FIGURE 11, and in a manner to be hereinafter described, the cable means 80 may be tightened and drawn about the trees by actuation of winches 75 and 76 by hydraulic motor 79. Upon such actuation guide arms 69 and 70 assume their closed position, as shown in FIG. 11, this, in effect, makes a noose or choker out of the flexible cable means 80 which, as it is tightened, binds together the severed sections of trees. Once the trees are so bundled, they may be retained together by passing suitable steel straps around the trees. The trees should actually be lifted off the ground during this operation and subsequently laid on suitable cross supports which support the trees off of the ground so as to permit the flexible cable 80 to be removed readily after the operation has been completed.

*Operation*

The operation of a mobile unit for felling and bunching trees embodying my invention will now be described.

The mobile unit such as is shown in FIGURE 1 is driven to a suitable location in the forest with the rear of tractor 1 adjacent a stand of trees. The operator by causing actuation of the hydraulically actuable means 17, 18 and 39 positions gripping means 4 (with lugs 29 in their open position) around the trunk of a tree in the manner shown in FIGURE 2. The operator then actuates lugs 29 and 29' to the closed position through actuation of hydraulically actuable means 31'. The serrated front edge 59 of dog 42 will bite into the stump of the tree in the manner shown in FIGURE 5, springs 45 being compressed when gripping means 4 is pressed against the tree by boom 3. In the next step, the chain saw 46 is caused to rotate by motor 49 and is pivotally actuated by control of hydraulically actuable means 50' so as to cause it to cut through the tree as shown in FIGURE 5. Subsequently, gripping means 4 is lifted slightly by suitable manipulation of the sections of boom 3, and at the same time gripping means 4 is tilted back to the position shown in dotted outlines in FIGURE 1 by control of hydraulically actuable means 39'. In this position the gripping means and the sawed-off section of a tree gripped thereby are tilted to an off-vertical position towards the tractor. This places the centre of gravity of the tree over the tractor 1, thereby making the apparatus stable. Hydraulically actuable means 7' is then actuated by the operator to cause rotation of boom 3 about vertical pivot 6. This rotation is complete when boom 3, gripping means 4 and the sawed-off section of a tree gripped thereby in the off-vertical position is directly in line with the longitudinal axis of the mobile unit. At all times the sawed-off section of the tree gripped in gripping means 4 by lugs 29 is supported by dog 42, which, as shown in FIGURE 4, is forced by springs 45 to a position under the base of the sawed-off section of the tree. Gripping means 4 then is tilted by actuation of hydraulically actuable means 39' in a vertical plane towards mobile bundling apparatus 2, i.e. the sawed-off section of a tree gripped by gripping means 4 is moved in a vertical plane away from tractor 1. Lugs 29 are then actuated to their open position and the sawed-off section of the tree falls in between side arms 62 and 63 of mobile bundling apparatus 2 and across flexible cable means 80. As aforementioned, as the tree is falling, dog 42 prevents the butt of the tree from dropping vertically in front of the butts of trees already in the bundling apparatus 2 if the gripping means 4 is only slightly off-vertical when the lugs 29 are opened.

The aforementioned operations are repeated as often as possible with tractor 1 in the same position. When no more trees can be reached from this position with boom 3 and gripping means 4, winch means 75 and 76 are actuated to cause bundling of the sawed-off sections of the trees in the manner shown in FIGURE 11. Assuming that in one position of tractor 1 sufficient trees can be reached to fill the bundling apparatus, once bundling apparatus 2 is full and the trees have been bundled together in the manner shown in FIGURE 11, a steel band or logging choker may be placed about the trees and the bundling cable 80 slackened leaving the bundle of trees behind as the tractor and bundling apparatus proceed to the next position. However, if in any one position of tractor 1 an insufficient number of trees to fill bundling apparatus 2 can be reached, these trees may be bundled in the manner shown in FIGURE 11 and skidded forward with the mobile unit embodying my invention to the next felling and bundling position. This may be repeated until mobile bundling apparatus 2 is at full capacity.

It will be noted from the foregoing that the main functions of mobile bundling apparatus 2 are to receive a plurality of sawed-off sections of trees at any one tree cutting position of the tractor and mobile bundling apparatus, to permit portions of these sawed-off sections of trees to be lifted from the ground and be tightly bundled together so that the sawed-off tree sections may be transported from one tree felling station to another without any of the sawed-off sections being lost during the journey, and, when the mobile bundling apparatus is full, to permit the sawed-off sections of trees to be lifted from the ground so that a suitable steel strap or the like can be placed around them when they are in tightly bundled configuration, the bound sections of trees then being left in the forest for pick-up by another vehicle, while the tractor and mobile bundling apparatus continues to another tree-felling station. It is most important to note that the aforementioned operations all may be carried out automatically by one operator. No helper is necessary.

It will be noted that apparatus of the type shown in FIGURES 22 and 23 of Canadian Patent No. 580,167, Thomas N. Busch et al., issued July 28, 1959, suffers serious disadvantages in this regard. In the case of the Busch apparatus, the cables on which the tree sections are loaded have to be manually attached to the lifting line of a crane. In contrast, my apparatus is designed such that the bundling or choking cable 80 may be opened to receive trees, closed to bundle trees and lifted to raise the trees automatically by the operator with no helper. This becomes important from the time and cost saving point of view where only a relatively small number of trees, much less than the capacity of apparatus 2, are loaded in apparatus 2 at each tree felling station. In addition, of course, the apparatus shown by Busch et al. obviously is not suitable for dragging long tree sections through the forest, as no means are provided to bundle these tree sections together tightly, and consequently some of these sections would undoubtedly be dragged from the cart and lost. In consequence of this Busch shows his cart supporting very short lengths of trees completely off of the ground, the short lengths of trees being sections cut from larger trees after the latter have been felled.

In describing a mobile unit embodying my invention I have not shown or described in detail the controls suitable for causing actuation of hydraulically actuable means 7, 17, 18, 31', 39', 50' and hydraulic motor 79. These controls are well known in the art and per se form no part of my invention. While I have particularly described hydraulically actuable means in connection with the operation of certain parts of my mobile unit, it will be apparent that other actuating means may be employed, e.g. electrical or mechanical means, without departing from my invention.

While I have described a preferred embodiment of my invention, it will be apparent that modifications and changes may be made therein without departing from the spirit and scope of the invention as defined in the appended claims.

What I claim as my invention is:

1. In combination with tree felling apparatus of the type having gripping means for gripping the trunk of an upright tree, sawing means for sawing through the trunk of said tree positioned below said gripping means, and means for moving said gripping means to remove the sawed-off section of a tree gripped thereby from the stump of said tree, the improvement which comprises a support positioned below said sawing means and slidably mounted on said gripping means, urging means normally urging said support to a position directly under the butt of said sawed-off section of said tree, said butt resting against said support during removal of said sawed-off section from said stump, said urging means urging said support towards and into said stump below the cutting line of said sawing means during sawing of said tree, said support firmly engaging said stump during sawing of said tree.

2. Apparatus as claimed in claim 1 wherein said support comprises a plate, and said urging means comprise spring means biasing said plate toward said stump of said tree.

3. Apparatus as claimed in claim 2 wherein the edge of said plate abutting said tree is serrated.

4. In combination with tree felling apparatus of the type having gripping means comprising a frame and lug means pivotally mounted on said frame and adapted to close on said trunk and secure said trunk between said frame and said lug means, sawing means positioned below said lug means for sawing through the said trunk of said tree below said lug means, and means for moving said gripping means to remove the sawed-off section of a tree gripped thereby from the stump of said tree, the improvement which comprises a support positioned below said sawing means and slidably mounted on said frame, urging means normally urging said support to a position directly under the butt of said sawed-off section of said tree, said butt resting against said support during removal of said sawed-off section from said stump, said urging means urging said support towards and into said stump below the cutting line of said sawing means during sawing of said tree, said support firmly engaging said stump during sawing of said tree.

5. In combination with tree felling apparatus of the type having gripping means comprising a pair of spaced-apart plates rigidly connected to one another and each having an opening therein to receive the trunk of an upright tree therein, and lug means pivotally mounted on said plates and adapted to close on said trunk, sawing means positioned below said lug means for sawing through the said trunk of said tree below said lug means, and means for moving said gripping means to remove the sawed-off section of a tree gripped thereby from the stump of said tree, the improvement which comprises a plate positioned below said sawing means and slidably mounted on said gripping means, and spring means normally urging said last mentioned plate to a position directly under the butt of said sawed-off section of said tree, said butt resting against said last mentioned plate during removal of said sawed-off section from said stump, said spring means urging said last mentioned plate towards and into said stump below the cutting line of said sawing means during sawing of said tree, said last mentioned plate firmly engaging said stump during sawing of said tree.

References Cited in the file of this patent

UNITED STATES PATENTS

| | | |
|---|---|---|
| 782,101 | Blaisdell | Feb. 7, 1905 |
| 1,583,613 | Smith | May 4, 1926 |
| 2,682,898 | Le Duc | July 6, 1954 |
| 2,707,008 | Bannister | Apr. 26, 1955 |
| 2,876,816 | Busch et al. | Mar. 10, 1959 |
| 2,882,941 | Pope | Apr. 21, 1959 |
| 2,948,311 | McCollum | Aug. 9, 1960 |

FOREIGN PATENTS

| | | |
|---|---|---|
| 46,482 | Sweden | Feb. 4, 1920 |